United States Patent
Takeda et al.

(10) Patent No.: US 6,281,266 B1
(45) Date of Patent: Aug. 28, 2001

(54) TAP HOLE BLOCKING MATERIAL FOR METAL MELTING APPARATUS

(75) Inventors: Kenzo Takeda, Toyonaka; Kunihiko Shiraishi; Fumiyuki Inoue, both of Toyota; Norio Honda, Toyota, all of (JP)

(73) Assignee: Nippon Crucible Co., Ltd. (JP)

( * ) Notice: Subject to any disclaimer, the term of this patent is extended or adjusted under 35 U.S.C. 154(b) by 0 days.

(21) Appl. No.: 09/581,803

(22) PCT Filed: Dec. 14, 1999

(86) PCT No.: PCT/JP99/07020

§ 371 Date: Jun. 16, 2000

§ 102(e) Date: Jun. 16, 2000

(87) PCT Pub. No.: WO00/35829

PCT Pub. Date: Jun. 22, 2000

(30) Foreign Application Priority Data

Dec. 15, 1998 (JP) .................................................. 10-356574

(51) Int. Cl.$^7$ ................. B22D 7/10; C04B 35/66
(52) U.S. Cl. ..................... 523/140; 524/594; 501/95; 501/97; 501/98; 501/100; 501/105; 501/127; 501/128; 501/130; 501/131
(58) Field of Search ................. 523/140; 524/592, 524/594; 501/109, 127, 128, 130, 99

(56) References Cited

U.S. PATENT DOCUMENTS

| 4,072,531 | 2/1978 | Funabiki | 523/140 |
| 4,377,413 | * 3/1983 | Nomura et al. | 106/76 |
| 5,783,509 | * 7/1998 | Manier | 501/197.1 |

FOREIGN PATENT DOCUMENTS

| 46473-A | * 3/1982 | (EP) | C04B/35/66 |
| 5-33496 B | 10/1975 | (JP) . | |
| 52147610-A | * 8/1977 | (JP) | C04B/35/66 |
| 63 288972A | 11/1988 | (JP) . | |
| 2-285014 A | 11/1990 | (JP) . | |
| 09 25172 A | 1/1997 | (JP) . | |
| 9-132471 A | 5/1997 | (JP) . | |

* cited by examiner

Primary Examiner—Margaret Medley
(74) Attorney, Agent, or Firm—Baker Botts LLP

(57) ABSTRACT

Disclosed is a taphole plugging composition for metal melting apparatus, the composition comprising (a) a refractory aggregate having a maximum particle size of 5 mm or less, (b) graphite and silicon nitride each having a maximum particle size of 0.2 mm or less, (c) a refractory clay, (d) a compatibilized binder mixture comprising a phenolic resin, a ketone compound and a pitch, and (e) an organic fine fiber.

6 Claims, No Drawings

TAP HOLE BLOCKING MATERIAL FOR METAL MELTING APPARATUS

TECHNICAL FIELD

The present invention relates to taphole plugging compositions for metal melting apparatus.

BACKGROUND ART

Taphole plugging compositions (muds) are prepared by kneading a mixture comprising a refractory aggregate such as alumina, silicon carbide, bauxite, mullite, chamotte, pyrophyllite or coke, using a binder such as tar or phenolic resin. The compositions are used to stop, when necessary, tapping of molten metal by closing tapholes through which molten metal is discharged from a metal melting apparatus. After a certain period of time from stoppage of tapping, a passageway for molten metal is formed through the compositions, so that tapping can be easily restarted. Therefore, taphole plugging compositions need to have various properties as described below.

Usually, a taphole plugging composition is packed into a taphole using an extruding tool called a mud gun. With insufficient plasticity, the plugging composition is incapable of being extruded from the mud gun or incapable of sufficiently plugging the taphole, failing to stop tapping. Thus, the plugging composition is required to have a suitable plasticity and to achieve a suitable density after plugging.

Further, the plugging composition is required to have, when being packed into a taphole, properties of being rapidly sintered (sinterability) by the heat in the metal melting apparatus (furnace) and a sufficient sintering strength to prevent molten metal from flowing out. A plugging composition with a poor sinterability does not sufficiently stop tapping, and molten metal will flow out and cause problems. Further, the plugging composition needs to have a high porosity (high gas permeability) after sintering, since the binder is rapidly gasified during solidification of the composition and is liable to make the composition disintegrate or coarsen.

After a certain period of time from the stoppage of tapping, a hole is bored through the sintered plugging composition using a drill, to restart tapping. When the composition has an excessively high sintering strength (strength after solidification), it will be time-consuming to bore a hole through the composition. Therefore, the composition needs to have a suitable sintering strength. Further, low-polluting properties are also important for the plugging composition, since smoke or dust is produced during boring.

Moreover, since molten metal passes through the bored hole, the sintered plugging composition is required to have a sufficient strength and corrosion resistance to withstand contact with molten metal, and a good adhesion strength to bricks forming the wall of the taphole. If these properties are insufficient, the diameter of the bored hole is enlarged, and molten metal is discharged scatteringly, making tapping unstable. In the worst case, the furnace must be closed before completion of tapping.

As binders for the plugging composition, tars and pitches have been long used because they are inexpensive.

"Tar" is a black or dark brown viscous oily bituminous material produced by heat treatment or pyrolysis of organic materials such as coal or wood. Tars include coal tars (oils produced by dry distillation of coal), shale tars (oils produced by dry distillation of oil shale), wood tars, oil gas tars (oils produced as byproducts of petroleum gasification), petroleum tar (a generic name of vaporization or distillation residues of petroleum or its pyrolysates, including petroleum asphalt, still residue, pyrolysis tar and the like). "Pitch" is a black carbonaceous solid residue obtained by heat treatment or pyrolysis (e.g., distillation such as dry distillation) of organic materials.

When a tar or a pitch is used as a binder for the plugging composition, the resulting composition has a good adhesion to bricks forming the taphole wall, but takes much time to sinter and is therefore liable to cause problems such as leakage of molten metal. Further, tars and pitches have a serious problem of heavy smoke and dust produced at the time of plugging or opening of the taphole.

Phenolic resins are also used as binders for the plugging composition. A plugging composition prepared using a phenolic resin has a quick drying characteristic (quick volatility of liquid components) and a high sintering strength. However, because of the excessively high sintering strength, it is difficult to bore a hole through the composition. Moreover, since phenolic resins are expensive, a plugging composition prepared using a phenolic resin is less economical than those prepared using inexpensive tars.

A combined use of a phenolic resin and a pitch has been developed recently, since each of these binders has advantageous properties as described above. However, a plugging composition comprising these binders in combination is insufficient in gas permeability (porosity) and adhesion strength to bricks forming the furnace wall.

TECHNICAL OBJECT

The main object of the present invention is to solve or significantly ameliorate the above problems of the prior art by providing a taphole plugging composition (mud) which fully exhibits advantageous properties of a pitch and a phenolic resin used as binders and which are excellent in gas permeability and adhesion strength.

DISCLOSURE OF THE INVENTION

The present inventors conducted extensive research to achieve the above object, and found that a taphole plugging composition (mud) comprising the components shown below has excellent properties. The present invention provides the following taphole plugging compositions:

1. A taphole plugging composition for metal melting apparatus, comprising (a) a refractory aggregate having a maximum particle size of 5 mm or less, (b) graphite and silicon nitride each having a maximum particle size of 0.2 mm or less, (c) a refractory clay, (d) a compatibilized binder mixture comprising a phenolic resin, a ketone compound and a pitch, and (e) an organic fine fiber.

2. A taphole plugging composition according to Item 1 wherein the refractory aggregate (a) is at least one member selected from the group consisting of alumina, high alumina, silicon carbide, bauxite, mullite, chamotte, pyrophyllite, coke, zirconia, ferrosilicon and magnesia.

3. A taphole plugging composition according to Item 1 wherein the compatibilized binder mixture (d) has a pitch content of 0.5 to 30 parts by weight per 100 parts by weight of the binder mixture.

4. A taphole plugging composition according to Item 1 wherein the organic fine fiber (e) is at least one member selected from the group consisting of polyester fibers, polyvinylalcohol fibers, acrylic fibers, polyvinyl chloride fibers, acetate fibers, rayon fibers, polyamide fibers, polyethylene fibers, polypropylene fibers, polyurethane fibers and polyvinylidene chloride fibers.

5. A taphole plugging composition according to Item 1 wherein the organic fine fiber (e) has a fiber diameter of 5 to 200 μm and a fiber length of 3 to 15 mm.

6. A taphole plugging composition according to Item 1, which comprises 100 parts by weight a refractory powder consisting of 60 to 85 parts by weight of the refractory aggregate (a), 5 to 30 parts by weight of the graphite and silicon nitride (b) and 5 to 15 parts by weight of the refractory clay (c); 15 to 25 parts by weight of the compatibilized binder mixture (d) relative to 100 parts by weight of the refractory powder; and 0.01 to 0.75 parts by weight of the organic fine fiber (e) relative to 100 parts by weight of the refractory powder.

The composition of the invention is a plugging composition (mud) for tapholes of metal melting apparatus, and comprises (a) a refractory aggregate having a maximum particle size of 5 mm or less, (b) graphite and silicon nitride each having a maximum particle size of 0.2 mm or less, (c) a refractory clay, (d) a compatibilized binder mixture comprising a phenolic resin, a ketone compound and a pitch, and (e) an organic fine fiber. Each of the components will be described below in detail.

(a) Refractory Aggregate

The refractory aggregate for use in the present invention has a maximum particle size of about 5 mm or less, preferably about 4 mm or less, more preferably about 3.5 mm or less. Also usable is a refractory aggregate wherein the proportion of particles having a particle size of 1 to 4 mm is not more than 40%.

Any refractory aggregates conventionally used in this technical field can be used in the invention without limitation. Usable refractory aggregates include alumina, high alumina, silicon carbide, bauxite, mullite, chamotte, pyrophyllite, coke, zirconia, ferrosilicon and magnesia. Among these aggregates, preferred are alumina, high alumina, silicon carbide, bauxite, mullite, chamotte, pyrophyllite and coke, among which alumina, high alumina, silicon carbide, bauxite and coke are more preferred. These aggregates can be used either singly or in combination.

(b) Graphite and Silicon Nitride

It is essential for the present invention to use graphite and silicon nitride in combination.

The graphite and silicon nitride for use in the invention each has a maximum particle size of usually about 0.2 mm or less, preferably about 0.15 mm or less, more preferably about 0.125 mm or less. Also usable is graphite and silicon nitride in each of which the proportion of particles having a particle size of 0.125 to 0.044 mm is not more than about 40%.

If the graphite has an excessively large maximum particle size, the resulting plugging composition shows a lowered lubricity during extrusion from the mud gun, and is liable to be extruded in an insufficient amount. Further, with an excessively large maximum particle size, the graphite has a smaller contact area with molten metal, so that the sintered plugging composition has a reduced corrosion resistance.

The silicon nitride is used to improve the corrosion resistance and sintering strength of the plugging composition. With an excessively large maximum particle size, the silicon nitride is reduced in specific surface area and in contact area with molten metal, resulting in a plugging composition with a poor corrosion resistance. Further, the resulting plugging composition contains the silicon nitride in a low volume ratio, and thus has a poor sintering strength.

The mixing ratio of the graphite and the silicon nitride is not limited, but it is preferred that the graphite:silicon nitride weight ratio be about 25~65:75~35, more preferably about 35~55:65~45.

(c) Refractory Clay

Any refractory clays conventionally used in this technical field can be used in the present invention without limitation. Usually, a highly refractory clay mainly comprising kaolinite, halloysite and like kaolin minerals is used.

The maximum particle size of the refractory clay is not limited, but is usually about 50 μm or less, preferably about 30 μm, more preferably about 20 μm or less. Also usable is a refractory clay wherein particles having a diameter of 1 μm or less account for at least 40%.

The proportions of the refractory aggregate (a), the graphite and silicon nitride (b) and the refractory clay (c) in the mixture of the three components (a) to (c) (hereinafter said mixture being sometimes referred to as "refractory powder") are not limited. However, the proportion of the refractory aggregate (a) is usually about 60 to 85 parts by weight, preferably about 70 to 83 parts by weight, per 100 parts by weight of the refractory powder; the proportion of the graphite and silicon nitride (b) is usually about 5 to 30 parts by weight, preferably about 8 to 20 parts by weight, per 100 parts by weight of the refractory powder; and the proportion of the refractory clay (c) is usually about 5 to 15 parts by weight, preferably about 7 to 13 parts by weight, per 100 parts by weight of the refractory powder.

(d) Compatibilized Binder Mixture

The compatibilized binder mixture for use in the present invention comprises a phenolic resin, a ketone compound and a pitch.

The phenolic resin may be any of phenolic resins, modified phenolic resins and like resins conventionally used as binders in this technical field. Commercial products of these resins are also usable. Examples of useful phenolic resins include novolac thermoplastic phenolic resins, resole thermosetting phenolic resins and benzilic ether thermosetting phenolic resins. Phenols usable as one material of phenolic resins include, for example, phenol and substituted phenols such as cresol and xylenol. Aldehydes usable as the other material of phenolic resins include, for example, formaldehyde, acetaldehyde, butylaldehyde and furfural. Phenolic resins may be used either singly or in combination.

The ketone compound for use in the compatibilized binder mixture is not limited and may be, for example, an aliphatic ketone, alkylaryl ketone, aromatic ketone or cyclic ketone.

Specific examples of ketone compounds include compounds represented by the formula (1)

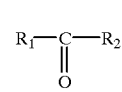

(1)

wherein $R_1$ and $R_2$ may be the same or different and each represent substituted or unsubstituted linear or branched $C_1$ to $C_6$ alkyl, substituted or unsubstituted linear or branched $C_1$ to $C_6$ alkenyl, substituted or unsubstituted $C_3$ to $C_8$ cycloalkyl, substituted or unsubstituted aryl, substituted or unsubstituted alalkyl, or like group; or $R_1$ and $R_2$ may be optionally taken together to form substituted or unsubstituted $C_3$ to $C_8$ cycloalkyl, substituted or unsubstituted aryl or like group.

The linear or branched $C_1$ to $C_6$ alkyl may be substituted by, for example, hydroxyl.

The linear or branched $C_1$ to $C_6$ alkenyl may be substituted by, for example, phenyl, naphthyl or like aryl, or hydroxyl.

The aryl may be, for example, phenyl or naphtyl.

The alkyl moiety of alalkyl may be, for example, linear or branched $C_1$ to $C_6$ alkyl. The aryl moiety of alalky may be, for example, phenyl or naphthyl, each of which may be substituted.

Each of the $C_3$ to $C_8$ cycloalkyl, aryl, and aryl moiety of alalkyl may be substituted by, for example, linear or branched $C_1$ to $C_6$ alkyl.

Specific examples of ketone compounds include acetone, diethyl ketone, methyl ethyl ketone, isobutyl methyl ketone, diisobutyl ketone, acetophenone, benzophenone, dicydlopropyl ketone, diacetone alcohol, mesityl oxide, phorone, isophorone, cyclohexanone, methylcyclohexanone, dypnone and camphor. Among these compounds, diacetone alcohol, mesityl oxide, phorone, cyclohexanone, methylcyclohexanone, acetophenone, dypnone and camphor are preferred. These compounds can be used singly or in combination.

The mixing ratio of the phenolic resin and the ketone compound in the compatibilized binder mixture is not limited, but the phenolic resin:ketone compound weight ratio is usually about 90~20:10~80, preferably about 80~30:20~70.

Any pitches conventionally used in this technical field can be employed as the pitch for use in the compatibilized binder mixture, without limitation. Examples of useful pitches include coal pitches (coal tar pitches), petroleum pitches and charcoal pitches.

The proportion of the pitch in the compatibilized binder mixture is not limited, but is usually about 0.5 to 30 parts by weight, preferably about 1 to 25 parts by weight, more preferably about 3 to 20 parts by weight, per 100 parts by weight of the binder mixture. When the proportion of the pitch is too large, the advantageous properties of the phenolic resin, such as the quick drying characteristic and good sintering strength, are impaired. Further, the resulting compatibilized binder mixture has an increased viscosity, and therefore the binder mixture needs to be added in an increased amount, hence uneconomical.

In the plugging composition of the invention, a tar can be used as a binder, in combination with the compatibilized binder mixture. Any tars conventionally used in this technical field can be employed without limitation. Examples of usable tars include coal tars (oils produced by dry distillation of coal), shale tars (oils produced by dry distillation of oil shale), wood tars, oil gas tars (byproducts of gasification of petroleum), petroleum tar (a generic name of vaporization or distillation residues of petroleum or its pyrolysates, including petroleum asphalt, still residue, pyrolysis tar and the like).

The proportion of the tar to be added is not limited, but is usually about 20 parts by weight or less, more preferably about 3 to 15 parts by weight, more preferably about 5 to 10 parts by weight, relative to 10 parts by weight of the compatibilized binder mixture.

The viscosity of the compatibilized binder mixture is not limited, but is usually about 1000 to 40000 mPa·s, preferably about 2000 to 10000 mPa·s, as measured at 30° C. If a tar is used in combination with the compatibilized binder mixture, the viscosity of the binder component consisting of the tar and compatibilized binder mixture is not limited, but is usually about 1000 to 40000 mPa·s, preferably about 2000 to 10000 mPa·s, as measured at 30° C.

The binder component for use in the Invention, which consists of the compatibilized binder mixture and optionally a tar, can be prepared by, for example, the following processes: First, a phenolic resin and a ketone compound are mixed together to obtain a solution. A pitch, optionally together with a tar, is added to the solution, followed by kneading. The kneading time is not limited as long as a homogeneous knead can be obtained, but is usually about 0.5 to 2 hours. Kneading may be carried out with heating, so as to reduce the viscosity of the pitch and tar. The heating temperature is not limited, but is usually about 100° C. or less, preferably about 60 to 80° C. Alternatively, a ketone compound and a pitch, optionally together with a tar, may be added at the same time to a phenolic resin, followed by kneading. Still alternatively, the compatibilized binder mixture may be first prepared and then mixed with a tar, followed by kneading. In these processes, the phenolic resin may be a resinified product, or may be unresinified materials, i.e., a phenol and an aldehyde. The unresinified materials, when used, are resinified during preparation of the compatibilized binder mixture.

The proportion of the compatibilized binder mixture in the plugging composition of the invention Is not limited, but is usually about 15 to 25 parts by weight, preferably about 17 to 23 parts by weight, relative to 100 parts by weight of the refractory powder. The proportion of the binder component consisting of the compatibilized binder mixture and tar (the combined amount of the compatibilized binder mixture and tar) is not limited, but is usually about 15 to 25 parts by weight, preferably about 17 to 23 parts by weight, relative to 100 parts by weight of the refractory powder.

(e) Organic Fine Fiber

Any organic fine fibers may be used in the present invention as long as they have a melting point lower than the furnace wall temperature (about 300° C.). The melting point of the organic fine fiber is preferably about 250° C. or lower, more preferably about 100 to 200° C. Examples of fibers having such an melting point include polyester fibers, polyvinylalcohol fibers, acrylic fibers, polyvinyl chloride fibers, acetate fibers, rayon fibers, polyamide fibers, polyethylene fibers, polypropylene fibers, polyurethane fibers, polyvinylidene chloride fibers and other low-melting organic fibers. Among these fibers, preferred are polyester fibers, polyvinylalcohol fibers, acrylic fibers and polyvinyl chloride fibers, among which polyester fibers and polyvinylalcohol fibers are more preferred. These organic fine fibers can be used singly or in combination.

The organic fine fiber is not limited in form, as long as it has a fibrous form. The fiber diameter of the organic fine fiber is not limited, but is usually about 5 to 200 μm, preferably about 5.5 to 100 μm, more preferably about 6 to 50 μm. If the fiber diameter is too small. the organic fine fiber has a poor dispersibility in the plugging composition. On the other hand, if the fiber diameter is too large, it is likely that the contemplated result cannot be achieved. The fiber length of the organic fine fiber is not limited, but is usually about 3 to 15 mm, preferably about 4.5 to 12 mm. If the fiber length is too short, the fiber is in powder form and does not function as a fiber, whereas if the fiber length is too long, the plugging composition will have a reduced lubricity.

The proportion of the organic fine fiber is not limited, but is usually about 0.01 to 0.75 parts by weight, preferably about 0.03 to 0.7 parts by weight, more preferably about 0.05 to 0.6 parts by weight, relative to 100 parts by weight of the refractory powder. If the proportion of the fiber is too small, the resulting plugging composition is insufficient in gas permeability and adhesion strength. On the other hand, if the proportion of the fiber is too large, the resulting plugging composition is liable to be insufficient in kneading properties, plasticity and lubricity (extrudability). Further, the necessary amount of the compatibilized binder mixture is increased, hence economically disadvantageous.

The plugging composition of the present invention may further contain, where necessary, additives conventionally used in this technical field. Usable additives include curing agents and viscosity modifiers. Examples of curing agents include hexamethylene tetramine and paraformaldehyde. Examples of viscosity modifiers include ethylene glycol, diethylene glycol, propylene glycol and other glycols; and polyoxyethylene nonylphenol, polyoxyethylene oleyl ether, sodium dodecylbenzene-sulfonate and like surfactants.

The plugging composition of the invention can be prepared, for example, as follows: First, the particle size of the refractory aggregate (a), the graphite and silicon nitride (b), and the clay (c) is adjusted in an ordinary manner, and the three components were mixed together to prepare a refractory powder. An organic fine fiber is added to the refractory powder, followed by mixing until the fiber has been thoroughly dispersed. Then, the compatibilized binder mixture is added with mixing and heating, followed by kneading to homogeneity to thereby obtain a plugging composition. When a tar is used as a binder in combination with the compatibilized binder mixture, the tar may be added to the plugging composition prepared, followed by kneading to homogeneity. Alternatively, the tar may be previously mixed with the compatibilized binder mixture to prepare a binder component, which is then added to a mixture of the refractory powder and the organic fine fiber, to thereby obtain a plugging composition.

The plugging composition of the invention is useful for plugging tapholes of blast furnaces for producing pig iron or the like, electric furnaces, cupolas and like metal melting apparatus.

EFFECTS OF THE INVENTION

The taphole plugging composition (mud) of the invention has advantageous properties of both of the pitch and phenolic resin used as binders. Stated more specifically, the plugging composition of the invention has the following remarkable properties.

1) The composition is easily kneadable and has a high plasticity and a high density after plugging, and therefore is readily applicable to tapholes.
2) The composition has good sinterability, and therefore is capable of stopping tapping of molten metal immediately after being packed into the taphole.
3) The composition has good gas permeability because of its high porosity, and thus is unlikely to disintegrate or coarsen during sintering.
4) The composition as sintered shows a high permanent linear change and a high adhesion strength to the furnace wall, since the organic fine fiber contained in the composition is melted by the temperature of the furnace wall when the composition is packed into the taphole.
5) The composition has a good corrosion resistance after sintering, and thus can prevent molten metal from flowing out over a long period of time.
6) The composition has a suitable sintering strength, and therefore the composition can prevent molten metal from flowing out, and a hole can be easily bored through the composition.
7) The composition does not produce smoke or dust during boring.
8) The composition is inexpensive.

BEST MODE FOR CARRYING OUT THE INVENTION

The following examples are provided to illustrate the invention in detail and not to limit the scope of the claims of the invention.

EXAMPLES 1 to 6

Preparation of Plugging Compositions (a) A refractory aggregate, (b) graphite and carbon nitride and (c) a refractory clay were subjected to particle size adjustment, and mixed together to prepare a refractory powder. To the refractory powder was added (e) an organic fine fiber, and the resulting mixture was mixed until the organic fine fiber had been thoroughly dispersed. Then, (d) a compatibilized binder mixture was added, followed by kneading. When a tar was used as a binder in combination with the compatibilized binder mixture, the tar was added to the plugging composition previously prepared from the other components than the tar, and the resulting composition was kneaded to homogeneity. In the above process, all the kneading steps were carried out at 70° C.

Table 1 shows the proportions of the components used in Examples 1 to 6. The tar and pitch were a coal tar and a coal pitch, respectively. The compatibilized binder used was "NK-3" manufactured by Kanae Kagaku Kogyo K. K. The organic fine fiber used was a polyester fiber having a fiber diameter of 15 $\mu$m (2 deniers).

TABLE 1

| | Example | | | | | | Comparative Example | | | | | | | | |
|---|---|---|---|---|---|---|---|---|---|---|---|---|---|---|---|
| | 1 | 2 | 3 | 4 | 5 | 6 | 1 | 2 | 3 | 4 | 5 | 6 | 7 | 8 | 9 |
| Alumina (3.4 mm or less) | 15 | 15 | 15 | 15 | 15 | 15 | | | 15 | 15 | 15 | 16.5 | 16 | | 15 |
| Alumina (6 mm or less) | | | | | | | 15 | 15 | | | | | | | |
| Alumina (5 to 8 mm) | | | | | | | | | | | | | | 15 | |
| Bauxite (3.4 mm or less) | 15 | 15 | 15 | 15 | 15 | 15 | | | 15 | 15 | 15 | 16.5 | 16 | 15 | 15 |
| Bauxite (6 mm or less) | | | | | | | 15 | 15 | | | | | | | |
| Coke (3 mm or less) | 10 | 10 | 10 | 10 | 10 | 10 | 10 | 10 | 10 | 10 | 10 | 11 | 10.5 | 10 | 10 |
| High alumina fine powder (0.5 mm or less) | 18 | 18 | 18 | 18 | 18 | 18 | 18 | 18 | 18 | 18 | 18 | 20 | 19 | 18 | 18 |
| Silicon carbide fine powder (0.5 mm or less) | 24 | 24 | 24 | 24 | 24 | 24 | 24 | 24 | 24 | 24 | 24 | 26 | 25 | 24 | 24 |
| Graphite (0.125 mm or less) | 4 | 4 | 4 | 4 | 4 | 4 | 4 | 4 | 4 | 4 | 4 | 4.5 | 4 | | 4 |
| Graphite (1 to 3 mm) | | | | | | | | | | | | | | 4 | |
| Silicon nitride (0.125 mm or less) | 5 | 5 | 5 | 5 | 5 | 5 | 5 | 5 | 5 | 5 | 5 | 5.5 | | 5 | 5 |
| Refractory clay (20 $\mu$m or less) | 9 | 9 | 9 | 9 | 9 | 9 | 9 | 9 | 9 | 9 | 9 | | 9.5 | 9 | 9 |

TABLE 1-continued

|  | Example | | | | | | Comparative Example | | | | | | | | |
| --- | --- | --- | --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 | 7 | 8 | 9 |
| Total amount of refractory powder | 100 | 100 | 100 | 100 | 100 | 100 | 100 | 100 | 100 | 100 | 100 | 100 | 100 | 100 | 100 |
| Compatibilized binder mixture (pitch: 5 wt. parts) | 18 | 18 | 18 | 10 |  | 18 |  |  |  |  | 18 | 18 | 18 | 18 | 18 |
| Compatibilized binder mixture (pitch: 10 wt. parts) |  |  |  |  | 19 |  |  |  |  |  |  |  |  |  |  |
| Phenolic resin |  |  |  |  |  |  |  | 18 | 21 | 18 |  |  |  |  |  |
| Tar |  |  |  | 8 |  |  | 18 |  |  |  |  |  |  |  |  |
| Organic fine fiber (fiber length: 6 mm) | 0.1 | 0.3 | 0.5 | 0.3 | 0.3 | 0.2 |  |  | 0.8 |  |  | 0.1 | 0.1 | 0.1 |  |
| Metallic fiber (fiber length: 6 mm) |  |  |  |  |  |  |  |  |  |  |  |  |  |  | 0.1 |

Notes:
1) The values presented in Table 1 are proportions (parts by weight) based on 100 parts by weight of the refractory powder.
2) The value shown with the name of each component of the refractory powder indicates the maximum particle size or particle size range.
3) The value shown below the term "Compatibilized binder mixture" indicates the proportion (parts by weight) of the pitch per 100 parts by weight of the binder mixture.

Table 2 shows the particle size distribution of the refractory powder (maximum particle size: 3.4 mm) used in Examples 1 to 6 and in Comparative Examples 3 to 7 and 9 given hereinafter. Table 3 shows the particle size distribution of the refractory clay used in Examples 1 to 6 and in Comparative Examples 1 to 5 and 7 to 9 given hereinafter.

TABLE 2

| Particle size (mm) | <0.125 | 0.125~1 | 1~2 | 2~3.4 | >3.4 |
| --- | --- | --- | --- | --- | --- |
| Proportion (%) | 50 | 30 | 10 | 10 | 0 |

| Particle size (μm) | <0.5 | 0.5~1 | 1~2 | 2~5 | 5~10 | 10~20 |
| --- | --- | --- | --- | --- | --- | --- |
| Proportion (%) | 21 | 16 | 15 | 22 | 19 | 7 |

Table 4 shows characteristics of the compatibilized binder mixture (containing 5 parts by weight of a pitch per 100 parts by weight of the binder mixture) used in Examples 1 to 4 and 6 and in Comparative Examples 5 to 9 given hereinafter.

TABLE 4

| Appearance | Black viscous liquid |
| --- | --- |
| Main component | Modified phenolic resin |
| Proportion of phenolic resin | 65.0 parts by weight |
| Proportion of ketone compound | 30.0 parts by weight |
| Proportion of pitch | 5.0 parts by weight |
| Viscosity at 30° C. | 6200 mPa · s |
| Specific gravity at 20° C. | 1.1 |
| Residual carbon content | 30.8 % |

Table 5 shows the kneading properties, plasticity, lubricity (extrudability), sinterability, polluting properties, adhesion strength and economy of the plugging compositions prepared in Examples 1 to 6 and in Comparative Examples 1 to 9 given hereinafter. Table 6 shows the permanent linear change, modulus of rupture, compression strength, porosity and corrosion index of the plugging compositions prepared in Examples 1 to 6 and in Comparative Examples 1 to 9.

TABLE 5

|  | Example | | | | | | Comparative Example | | | | | | | | |
| --- | --- | --- | --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 | 7 | 8 | 9 |
| Kneading properties | A | A | A | A | A | A | B | B | C | B | B | D | B | D | A |
| Plasticity | A | A | A | A | A | A | C | C | C | C | C | D | B | D | A |
| Lubricity (Extrudability) | A | A | B | A | B | A | D | D | C | C | C | D | B | D | C |
| Sinterability (MPa) | 3.5 | 3.7 | 4.0 | 2.1 | 3.3 | 3.6 | 0.0 | 3.4 | 2.7 | 3.2 | 2.1 | — | 1.9 | — | 2.2 |
| Polluting properties | Low | Low | Low | Medium | Low | Low | High | Low | Low | Low | Low | Low | Low | Low | Low |
| Adhesion strength (MPa) | 0.63 | 0.65 | 0.68 | 0.73 | 0.70 | 0.65 | 0.56 | 0.48 | 0.31 | 0.50 | 0.51 | — | 0.47 | — | 0.31 |
| Economy | B | B | B | A | B | B | A | D | D | D | B | B | B | B | B |

Notes:
1) The alphabetic symbols in Table 5 indicate the following:
A: Good; B: Satisfactory; C: Slightly poor; D: Poor.
2) The kneading properties and plasticity were evaluated based on the tactile characteristics of the kneads.

TABLE 5-continued

|  | Example | | | | | | Comparative Example | | | | | | | | |
|---|---|---|---|---|---|---|---|---|---|---|---|---|---|---|---|
|  | 1 | 2 | 3 | 4 | 5 | 6 | 1 | 2 | 3 | 4 | 5 | 6 | 7 | 8 | 9 |

3) The lubricity (extrudability) was tested as follows: The plugging compositions were placed each into a cylindrical container (100 mm in diameter) with an end portion tapered at an angle of 45° to a diameter of 20 mm. Each composition was extruded from the opening (20 mm in diameter) at the tapered end, at a pressure of 100 kg/cm² to evaluate the lubricity (extrudability) based on the continuity and surface characteristics of the extruded compositions.
4) The sinterability was tested as follows: The plugging compositions were shaped each into a cylinder (50 mm in diameter and 50 mm in height) and placed in an atmosphere at 600° C. for 10 minutes. Then, the sintered compositions were taken out to measure the compression strength.
5) The polluting properties were tested as follows: The plugging compositions were shaped each into a cylinder (50 mm in diameter and 50 mm in height) and placed in an atmosphere at 600° C. for 10 minutes to evaluate the amount of smoke produced.
6) The adhesion strength was tested as follows: The plugging compositions were shaped each into a cylinder (50 mm in diameter and 50 mm in height) and pressed onto a chamotte brick heated to 800° C. The compositions were heated at 800° C. for 10 minutes to allow the compositions sinter and adhere to the bricks. Then, the adhesion strength to the bricks was measured.

TABLE 6

|  | Example | | | | | | Comparative Example | | | | | | | | |
|---|---|---|---|---|---|---|---|---|---|---|---|---|---|---|---|
|  | 1 | 2 | 3 | 4 | 5 | 6 | 1 | 2 | 3 | 4 | 5 | 6 | 7 | 8 | 9 |
| Permanent linear change (%) | +0.1 | +0.2 | +0.4 | +0.0 | +0.3 | +0.1 | −0.4 | −0.6 | −0.7 | −0.6 | −0.1 | — | +0.1 | — | −0.1 |
| Modulus of rupture (MPa) | 11.1 | 11.9 | 12.8 | 10.7 | 11.5 | 12.3 | 9.4 | 10.4 | 8.1 | 9.9 | 10.7 | — | 4.3 | — | 9.8 |
| Compression strength (MPa) | 19.4 | 20.1 | 22.5 | 22.9 | 23.1 | 20.4 | 15.0 | 18.2 | 16.6 | 17.8 | 18.6 | — | 8.4 | — | 15.5 |
| Porosity (%) | 21.3 | 22.2 | 23.6 | 22.9 | 23.1 | 21.8 | 26.3 | 20.9 | 22.2 | 20.7 | 21.1 | — | 23.2 | — | 21.0 |
| Corrosion index | 89 | 92 | 94 | 97 | 95 | 89 | 100 | 99 | 103 | 100 | 98 | — | 107 | — | 97 |

Notes:
1) The permanent linear change was measured as follows: The plugging compositions were shaped each into a rectangle (40 mm × 40 mm × 160 mm) and press-molded at a pressure of 100 kg/cm². After press-molding, the length that had initially been 160 mm was measured as $l_1$. The press-molded compositions were sintered in a reducing atmosphere at 1450° C. for 3 hours. After sintering, the length that had initially been 160 mm was measured as $l_2$. The permanent linear change is the rate of change in the length, calculated according to the following equation: Permanent linear change (%) = $(l_2 - l_1)/l_1) \times 100$
2) The modulus of rupture and compression strength were measured according to JIS R2553.
3) The corrosion index was determined as follows: The plugging compositions were shaped and placed in a high-frequency test melting furnace. Then, iron and slag were melted at 1500° C. in the test melting furnace. The corrosion amount of each composition was measured to find a corrosion index. The lower the corrosion index, the better the corrosion resistance.

The plugging compositions of Examples 1 to 6, after sintering, showed a sintering strength sufficient to stop tapping, and a hole was easily bored through the sintered compositions.

The plugging compositions of Examples 1 to 3 and 6 vary in amount of the organic fine fiber added. Table 6 reveals that these compositions are good in kneading properties, plasticity and lubricity (extrudability), and thus readily applicable to tapholes. Further, Table 7 shows that the permanent linear change values of these compositions were positive, and that these compositions were excellent in physical properties such as corrosion resistance. Moreover, they exhibit good sinterability, high adhesion strength and other excellent properties as taphole plugging compositions, as compared with the compositions of the Comparative Examples given hereinafter.

The plugging composition of Example 4 contains both of a compatibilized binder mixture according to the invention and a tar conventionally used as a binder. The composition of Example 4 can be prepared with improved economy, without impairing advantageous properties of the compatibilized binder mixture.

The plugging composition of Example 5 contains a compatibilized binder mixture containing 10 parts by weight of a pitch as dissolved in 100 parts by weight of the binder mixture. As to the composition of Example 5, the amount of the compatibilized binder mixture to be added is slightly increased since the binder mixture has a slightly high viscosity. However, the composition has acceptable economy and excellent properties.

COMPARATIVE EXAMPLES 1 and 2

Plugging compositions were prepared by following the procedure of Example 1 except that a refractory aggregate having a maximum particle size of 6 mm or less was used, and that a tar or a phenolic resin was used as a binder in place of the compatibilized binder mixture, and that the organic fine fiber was not used. Table 1 shows the proportions of the components used.

The compositions of Comparative Examples 1 and 2 are poor in plasticity, lubricity (extrudability) and other properties, because of the excessively large particle size of the refractory aggregate (alumina or bauxite). The composition of Comparative Example 1, although economical, is markedly inferior to the compositions of the Examples in sinterability and non-polluting properties. The composition of Comparative Example 2 is satisfactory in sinterability and non-polluting properties, but inferior in adhesion strength and economy to the compositions of the Examples.

COMPARATIVE EXAMPLE 3

A plugging composition was prepared by following the procedure of Example 1 except that a phenolic resin was used in place of the compatibilized binder mixture. Table 1 shows the proportions of the components used.

The plugging composition of Comparative Example 3 is insufficient in kneading properties, plasticity, lubricity (extrudability), adhesion strength and other properties, as compared with the compositions of the Examples. Further, this composition is uneconomical since it contains a large amount of the phenolic resin as a binder.

COMPARATIVE EXAMPLE 4

A plugging composition was prepared by following the procedure of Example 1 except that a phenolic resin was used in place of the compatibilized binder mixture, and that the organic fine fiber was not used. Table 1 shows the proportions of the components used.

The composition of Example 4 is uneconomical and insufficient in plasticity, lubricity (extrudability), corrosion resistance and other properties, as compared with the compositions of the Examples. Further, it is more time-consuming to bore a hole through this composition, than through the compositions of the Examples.

COMPARATIVE EXAMPLE 5

A plugging composition was prepared by following the procedure of Example 1 except that the organic fine fiber was not used.

The composition of Comparative Example 5 is insufficient in plasticity, lubricity (extrudability) and corrosion resistance, as compared with the compositions of the Examples. Further, due to its negative permanent linear change value, this composition is inferior to the compositions of the Examples in adhesion strength to the furnace wall.

COMPARATIVE EXAMPLE 6

The procedure of Example 1 was followed except that the refractory clay was not used, in order to prepare a plugging composition. However, the resulting composition was difficult to knead and showed poor plasticity, hence incapable of being shaped. Accordingly, it was impossible to test the sinterability, adhesion and other properties of the composition.

COMPARATIVE EXAMPLE 7

A plugging composition was prepared by following the procedure of Example 1 except that the silicon nitride was not used.

The composition of Comparative Example 7 is inferior in sinterability, and in particular, markedly inferior in corrosion resistance to the compositions of the Examples.

COMPARATIVE EXAMPLE 8

The procedure of Example 1 was followed except that alumina having a particle size range of 5 to 8 mm and graphite having a particle size range of 1 to 3 mm were used, in order to prepare a plugging composition. However, the resulting composition was difficult to knead and showed poor plasticity, hence incapable of being shaped. Accordingly, it was impossible to test the sinterability, adhesion and other properties of the composition.

COMPARATIVE EXAMPLE 9

A plugging composition was prepared by following the procedure of Example 1 except that a metal fiber (a cast iron fiber having a fiber diameter of 90 $\mu$m) was used in place of the organic fine fiber.

The composition of Comparative Example 9 is inferior in sinterability and corrosion resistance to the compositions of the Examples.

COMPARATIVE EXAMPLE 10

An attempt was made to prepare a binder mixture consisting only of a phenolic resin (9 parts by weight) and a pitch (1 part by weight). However, the phenolic resin and pitch were incompatible with each other and did not form a homogeneoous mixture. It was therefore impossible to prepare a plugging composition using a binder mixture consisting only of the phenolic resin and pitch.

What is claimed is:

1. A taphole plugging composition for metal melting apparatus, comprising (a) a refractory aggregate having a maximum particle size of 5 mm or less, (b) graphite and silicon nitride each having a maximum particle size of 0.2 mm or less, (c) a refractory clay, (d) a compatibilized binder mixture comprising a phenolic resin, a ketone compound and a pitch, and (e) an organic fine fiber.

2. A taphole plugging composition according to claim 1 wherein the refractory aggregate (a) is at least one member selected from the group consisting of alumina, high alumina, silicon carbide, bauxite, mullite, chamotte, pyrophyllite, coke, zirconia, ferrosilicon and magnesia.

3. A taphole plugging composition according to claim 1 wherein the compatibilized binder mixture (d) has a pitch, content of 0.5 to 30 parts by weight per 100 parts by weight of the binder mixture.

4. A taphole plugging composition according to claim 1 wherein the organic fine fiber (e) is at least one member selected from the group consisting of polyester fibers, polyvinylalcohol fibers, acrylic fibers, polyvinyl chloride fibers, acetate fibers, rayon fibers, polyamide fibers, polyethylene fibers, polypropylene fibers, polyurethane fibers and polyvinylidene chloride fibers.

5. A taphole plugging composition according to claim 1 wherein the organic fine fiber (e) has a fiber diameter of 5 to 200 $\mu$m and a fiber length of 3 to 15 mm.

6. A taphole plugging composition according to claim 1, which comprises 100 parts by weight a refractory powder consisting of 60 to 85 parts by weight of the refractory aggregate (a) 5 to 30 parts by weight of the graphite and silicon nitride (b) and 5 to 15 parts by weight of the refractory clay (c) 15 to 25 parts by weight of the compatibilized binder mixture (d) relative to 100 parts by weight of the refractory powder; and 0.01 to 0.75 parts by weight of the organic fine fiber (e) relative to 100 parts by weight of the refractory powder.

* * * * *